UNITED STATES PATENT OFFICE.

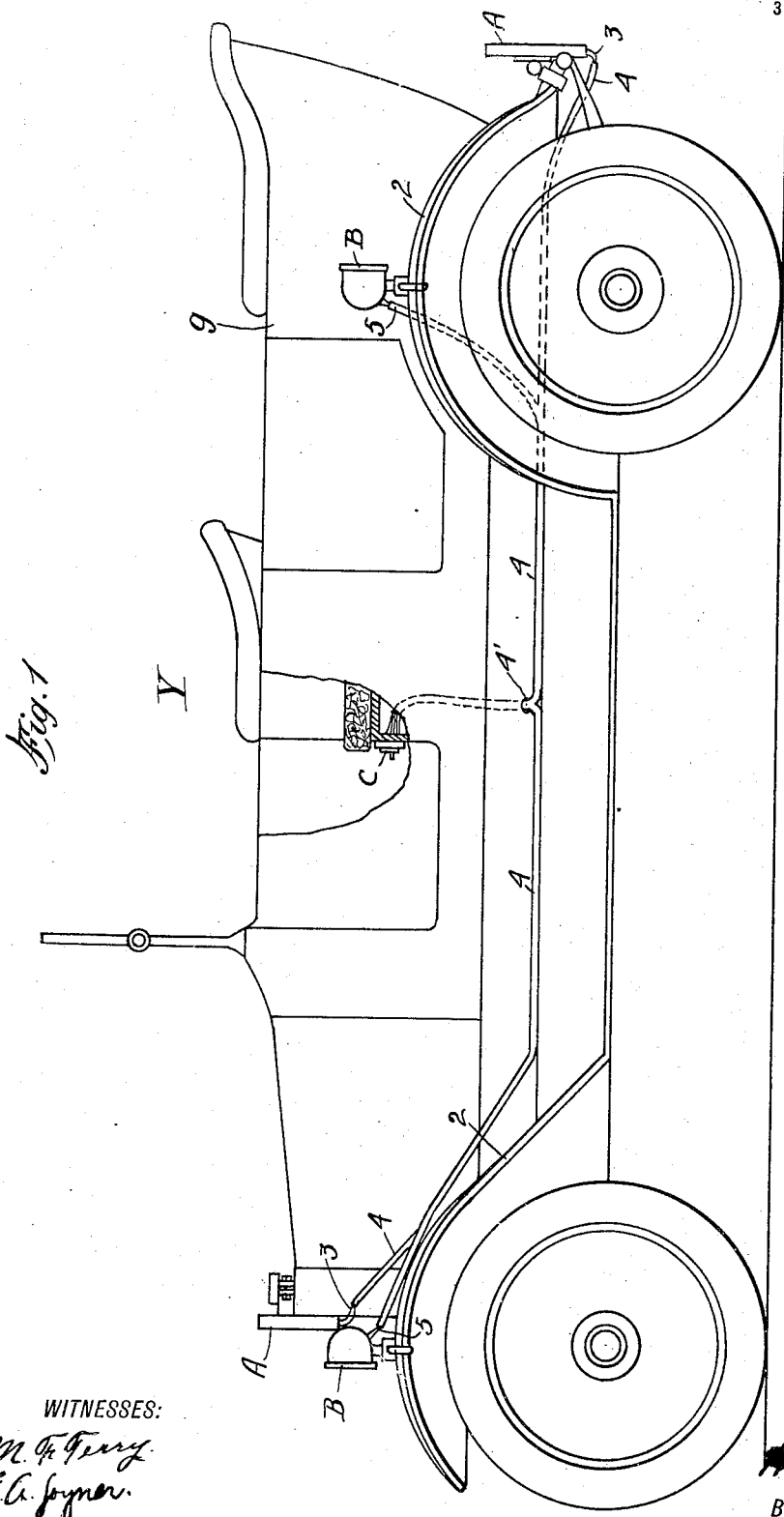

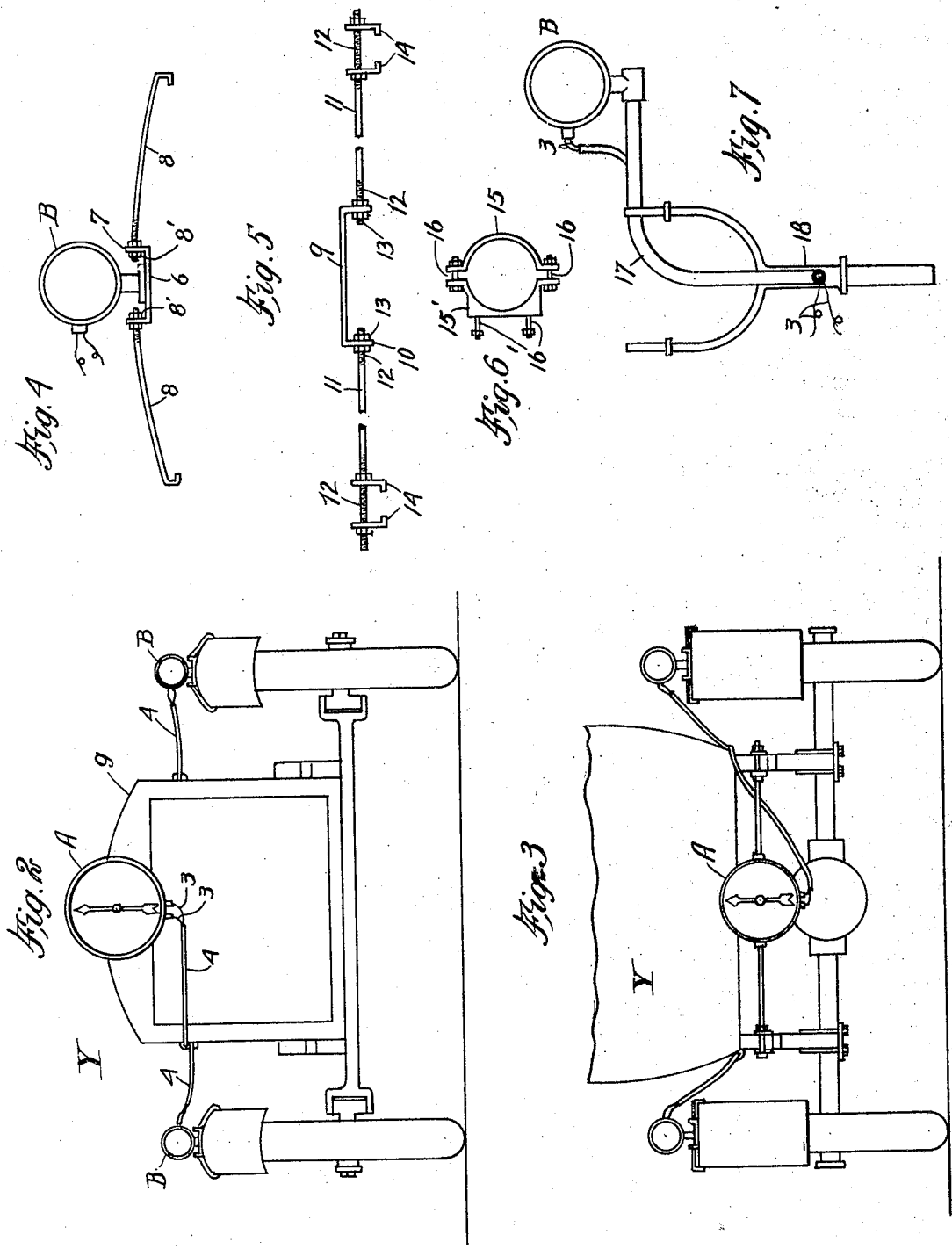

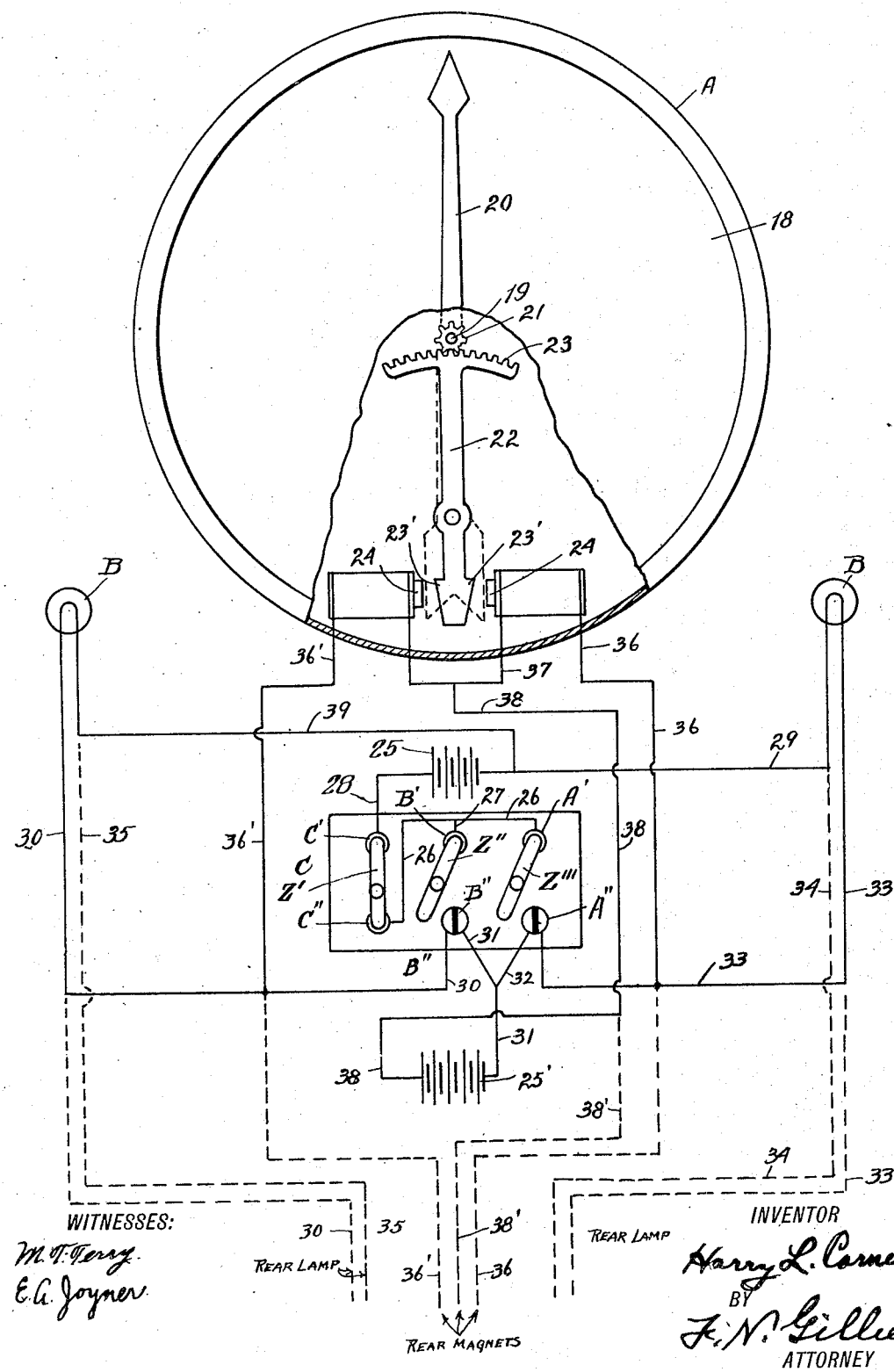

HARRY L. CORNELL, OF BINGHAMTON, NEW YORK.

ELECTRICAL SIGNAL SYSTEM FOR AUTOMOBILES.

1,341,735.　　　　　　　Specification of Letters Patent.　　Patented June 1, 1920.

Application filed February 14, 1916. Serial No. 78,132.

*To all whom it may concern:*

Be it known that I, HARRY L. CORNELL, a citizen of the United States, residing at Binghamton, in the county of Broome and State of New York, have invented certain new and useful Improvements in Electrical Signal Systems for Automobiles, of which the following is a specification.

My invention relates to an improvement in electrical signal systems for automobiles to indicate the direction in which an automobile is about to turn and in which an indicator on the face of a dial mounted on the front and rear of the automobile swings to the right or left, together with front and rear colored side lamps mounted upon or over the front and rear mud guards of the automobile and caused to be lighted as desired, the indicator moving to the right or left and the lighting of the side lights all to be controlled by an electrical system mounted on the vehicle from a battery as a source of energy also carried on the automobile. In connection with the above is a switch board having movable members thereon in convenient reach of the driver whereby proper movement can be given to the indicator and the illumination of the lamps on one side or the other of the vehicle may be made simultaneously and whenever desired. One of the number of objects of the invention is to provide a simple eletrical signal for automobiles which will indicate both at the front and rear of the vehicle the direction in which the vehicle is about to turn on the highway.

With this object in view my invention consists in certain novel features of construction and arrangement of parts as will be hereinafter fully described and pointed out in the claims, reference being had to the accompanying drawings in which—

Figure 1 is a side view of an automobile with my device mounted thereon. Fig. 2 is a front elevation of my device mounted on the front end of an automobile. Fig. 3 is a front elevation of my device mounted on the rear end of an automobile. Fig. 4 is a front elevation of a fragmentary part of my device used with the front mud guards. Fig. 5 is a front elevation of a fragmentary part of my device used for mounting the rear indicator. Fig. 6 is a plan view of a fragmentary part of my device. Fig. 7 is a front elevation of a modified form of my device. Fig. 8 is an elevation on an enlarged scale of the indicator partly broken away and also showing a diagram of the electrical circuits connected thereto and to the lamps.

The same reference characters denote like parts in each of the several figures of the drawing.

In carrying out my invention I provide an indicator A mounted in a casing or support on the front and rear end of an automobile Y. Mounted on the front and rear mud guards 2. 2 on either side of the automobile Y I have the colored electrical lamp casings B. B in which are mounted colored light bulbs such as green at the right and blue at the left and connected with A. A I have the electrical wires 3. 3 mounted in the tubular mounting 4. 4 and passing through said tubular mounting into the interior of the automobile body Y at the point 4' and thence to the switch board C. From the lamps mounted in B. B I have the wire connections 5. 5 passing through tube 4. 4 and thence into the interior of the automobile body Y and to the switch board C.

As a further part of my device I have the lamp support 6 having the upturned ends 7. 7 and mounted through openings in these upturned ends are the ends of the clamping bars 8. 8 which have on the inner threaded ends thereof the nuts 8'. 8', and mounted in any convenient manner on standard 6 I have the lamp casing B in which is the colored electrical bulb. To support the indicator A at the rear end of the automobile Y I have the support 9 with the projecting end lugs 10. 10 and through openings in said end lugs are inserted clamping rods 11. 11 having the threaded ends 12. 12 on the inner ends of which are the nuts 13. 13 mounted on the threaded outer ends of the rods 11. 11 are the hook lugs 14. 14.

In order to support the indicator A on the front of the automobile I have a support composed of the curved clamps 15. 15' adjustably held together by the nut bolts 16. 16 and projecting from 15' and mounted therein I have the nut bolts 16'. 16' adapted to connect in any convenient manner with the indicator A and hold and support the same.

In a modified form of my device I have the curved tubular lamp support 17 mounted in any convenient manner on the standard of the auto headlight 18 and adapted to project outward over the mud guard of the automobile and having mounted on the end thereof the lamp casing B and having connected therewith the wiring 3. 3 passing into the tubular support 17 and so on to the switch board C.

In the construction of the indicator A I have the dial face 18 and through dial face 18 I have the pivot 19 and mounted on the same I have the pointer 20; also mounted on 19 I have the gear wheel 21. Pivotally mounted behind the face 18 and in alinement with the gear wheel 21 I have the cog lever 22, which has at its upper end the series of cogs 23 and at the lower end of 22 I have the armature 23' and on either side of the armature 23' I have the magnets 24. 24 mounted in any convenient manner. The cogs 23 mesh with the cog wheel 19. Also mounted in any convenient manner within the automobile Y I have the batteries 25. 25' for the lighting current; also I have mounted at any convenient point for use a switch board C with the contacts C'. C''—B'. B''—A'. A'' therein. The series of contacts C'. B'. A' are for the lighting current. The series of contacts C''. B''. A'' are for shutting off the lighting current. From contact A' I have the wiring connection 26 extending from A' to C''. From the contact B' I have the wire 27 which connects with wire 26. From contact C' I have the wire 28 connecting with battery 25. From battery 25 I have the wire 29 extending to the lamp B at the right. From contact B'' I have the wire 30 extending to the front lamp B. Also from B'' I have the wire 31 extending to battery 25'. From A'' I have the wire 32 extending to wire 31. From A'' I have the wire 33 extending to the lamp B at the left. From lamp B at the right, I have the wire 34 extending to the rear lamp B on the right and also from the front lamp on the opposite side I have the wire 35 extending to the rear lamp B on the same side. From the front magnets 24. 24 I have the wires 36. 36' extending to the rear magnets. The front magnets 24. 24 are connected by a wire 37 and connecting wire 37 with the battery 25' I have wire 38. Connecting between wire 29 and wire 35 I have wire 39. Extending from wire 38 I have the wire 38' connecting with the rear magnets. Pivotally mounted on the switch board between the contacts I have the usual switch contacts Z'. Z''. Z''', and similarly mounted in the rear of the automobile in connection with the dial mounted thereon, I have the rear set of magnets in similar position as those in front.

In the day operation of my device I proceed as follows:

When the switch contacts Z' Z'' Z''' are all open the switch pointer 20 will be in vertical position and the lamps B extinguished. If the contact Z'' be moved to close circuit across the contact B'' current from battery 25' will then pass through wire 31, contact B'' wires 30, 36', magnet 24, at the right of the vehicle thence back by wires 37, 38 to battery 25' the circuit being closed, magnet 24 will attract armature 23' and swing the pointer 20 to the right of the automobile, indicating that the driver will turn to the right. If instead of closing circuit through contact B'' circuit be closed through contact A'' by means of contact Z''' the current will then travel from battery 25' by wires 31, 32, contact A'', wires 33, and 36 to the other magnet 24 then back by wires 37, 38 to battery. The newly charged magnet attracts the armature 23' and the pointer 20 to be swung to the opposite direction. Upon breaking the current through either magnet, the pointer will return to normal position.

In the night operation of my device, contact Z' is closed over contact point C'' thereby bringing battery 25 and circuit through lamps B into operative relation with the remainder of the switch devices. Closing the switch contact Z'' as previously described, beside serving to operate the pointer 20 will also close the circuit of battery 25, causing the current therefrom to pass through wires 29 and 39 to lamp B at the right of the vehicle thence back by wire 30 to contact point B'' switch contact Z'' wires 27 and 26, contact C'', Z' and C', to wire 28, and thence to battery, thus causing the light B at the right of the machine to glow and remain illuminated until the circuit is broken by disconnecting the switch contact Z'' from contact point B'', or breaking contact between Z' and C''. Closing the circuit between contacts Z'''' and A'' will close the circuit from battery 25 through wire 29 to lamp B at the left of the vehicle thence back by wire 33, contacts A'', Z''', A' wire 26 contacts C'', Z', and C', and wire 28 to battery. This causes the lamp at the left of the vehicle to glow. When it is desired to cut out the lights which will be the case during the day time, the contact Z' is moved away from contact upon C'' thus opening the circuit from battery 25.

Having thus described my invention, what I claim as new and for which I desire Letters Patent is as follows:

1. In an electric signaling system for vehicles, the combination of a pivoted direction indicator mounted on the vehicle, electrical mechanism for operating said indicator, a signal lamp on each side of the vehicle, a source of electrical energy for the indicator mechanism, a separate source of electrical energy for the lamps, a switch board on the vehicle, electrical circuits between the switch board, one source of energy and the indicator, circuits between the switch board, the other source of energy and the signal lamps, and movable contact members on the switch board for controlling the indicator circuit alone, and for closing the indicator circuit simultaneously through a selected signal lamp.

2. In an electrical signaling system, the combination of an indicator including electrical devices for operating the indicator in opposite directions, a source of electrical energy, a circuit between said source and each electrical device, a signal lamp at each side of the vehicle, a second source of electrical energy, independent circuits between said second source and the signal lamps, and a switch included in all of said circuits for independently closing said first circuits through said electrical devices to operate the indicator in the desired direction and for selectively closing said second source of electrical energy through the corresponding lamp circuits.

3. In an electrical signaling system for vehicles, the combination of a pivoted direction indicator carried by the vehicle, electromagnetic actuating means therefor, a source of electrical energy, suitable switch mechanism for selectively connecting said source with said actuating means to indicate a proposed change in the course of the vehicle, and two or more signal lamps also carried by the vehicle on opposite sides thereof and arranged to give a direction indication independent of and at points removed from the position of the said pivoted indicator, a separate source of electrical energy for said lamps, and circuits for said lamp signals adapted to be controlled by the switch mechanism of the pivoted direction indicator, and a switch in said circuits for connecting the lamp signal circuit with the controlling switch mechanism of the pivoted direction indicator.

In testimony whereof I have affixed my signature in the presence of two witnesses.

HARRY L. CORNELL.

Witnesses:
B. E. TAYLOR,
M. F. TERRY.